United States Patent [19]

Hanser

[11] 4,165,861
[45] Aug. 28, 1979

[54] VEHICLE LEVELING SYSTEM

[75] Inventor: Paul E. Hanser, Moline, Ill.

[73] Assignee: HWH Corporation, Rock Island, Ill.

[21] Appl. No.: 874,021

[22] Filed: Feb. 1, 1978

[51] Int. Cl.² ............................................. B66F 7/24
[52] U.S. Cl. ................................................. 254/86 H
[58] Field of Search ............... 254/86 H, 45; 280/764, 280/765

[56] References Cited

U.S. PATENT DOCUMENTS

| 2,442,881 | 6/1948 | Soskin | 254/86 H |
| 2,546,203 | 3/1951 | Tucker | 254/86 H |

FOREIGN PATENT DOCUMENTS

| 434610 | 4/1948 | Italy | 254/86 H |
| 57654 | 6/1937 | Norway | 254/86 H |

Primary Examiner—Robert C. Watson
Attorney, Agent, or Firm—Thomas E. Frantz

[57] ABSTRACT

A vehicle leveling system utilizing a plurality of support assemblies mounted on the bottom of the vehicle for rotative movement between an upper storage position and a lower operating position. Each support assembly includes two hydraulically extendable plungers and a control mechanism which automatically operates the plungers in sequence, the first plunger extending to rotate the support assembly into a vertical operating position and the second plunger then extending into engagement with the ground. Retraction of the plungers and return of the support assembly to its upper storage position are accomplished by spring means. The system also includes structure which will respond automatically to excessive internal pressure to permit rotation of the support assembly without damage either to the assembly or vehicle should the vehicle be moved inadvertently while the second plunger is in engagement with the ground.

13 Claims, 7 Drawing Figures

FIG. 1

VEHICLE LEVELING SYSTEM

BACKGROUND OF THE INVENTION

1. Field of the Invention

The present invention relates generally to the support of vehicles, and more particularly to a system of leveling and supporting trailers, campers, motorhomes, trucks and other vehicles in a level position while parked on uneven or sloping terrain.

2. Description of the Prior Art

It has been proposed in the past to provide various types of systems and devices for use in leveling and supporting a vehicle on uneven on sloping terrain. Such systems have included hydraulic jacks which are mounted on the bottom of the vehicle and which are pivoted to swing from a horizontal storage position to a vertical operating position prior to use. Representative of such prior proposals are the following patents:
U.S. Pat. Nos.
 4,061,309—Hanser
 4,050,718—Newcomb
 3,989,277—Stahl
 3,817,493—Hanser
 2,546,203—Tucker
 2,442,881—Soskin
French Pat. Nos.
 625,003—Gomez
 729,257—Marion Of these patents, U.S. Pat. Nos. 2,442,881 and 2,546,203 and the two French patents, are quite similar in structure and function. Each suggests a jack assembly having two hydraulic cylinders (or equivalent). The plunger of the first cylinder is extended not only to rotate the jack assembly into operating position but to expose an outlet through which fluid is directed to the second cylinder for extension of the second plunger. This outlet, of course, must remain open to permit later retraction of the second plunger. Thus, in the event of inadvertent movement of a vehicle having jack assemblies of the type suggested by these patents, excess pressure in either cylinder would keep the plunger of the other cylinder extended, leading to the likelihood of severe damage to the jack assemblies, the vehicle, or both.

U.S. Pat. No. 3,817,493 teaches an assembly having linkage which swings the jack down as the piston is extended. Particularly if the space below a vehicle should be quite limited, the piston in this type of structure may not be able to extend sufficiently to rotate the jack into proper operating position before contacting the ground. This could lead to improper and somewhat unstable vehicle support. Also, the linkage mechanism disclosed in this patent is susceptible to certain problems of possible malfunction should ice or dirt build up thereon.

U.S. Pat. Nos. 3,989,277 and 4,050,718 are directed to devices quite far removed from the present invention, but are cited as illustrative of other types of support systems that have been proposed. U.S. Pat. No. 3,989,277 teaches a simple manually operated screw type jack arrangement, and U.S. Pat. No. 4,050,718 an arrangement wherein the leveling jacks are rotated into position by movement of the vehicle to be supported. The first arrangement, of course, makes no provision for inadvertent movement of the vehicle, whereas the latter system obviously would be unstable and insecure.

U.S. Pat. No. 4,061,309, teaches a device for use in a leveling system wherein two hydraulic cylinders are extended in sequence to rotate the support assembly into operating position and then engage the ground. The arrangement shown in this patent overcomes the several problems discussed above relative to the other prior art, but the fluid by-pass arrangement through the first cylinder is relatively complicated and expensive both to manufacture and maintain.

SUMMARY OF THE INVENTION

In view of the above, it is a principal object of this invention to provide a simplified yet improved leveling system for vehicles.

It is another object of this invention to provide an improved and simplified leveling device for use in a vehicle leveling and support system.

A still further objective of this invention is the provision of a support assembly having a simple yet rugged and efficient control mechanism for two plungers extending in sequence, one rotating the assembly to and holding the assembly in its operating position, and the other then extending into engagement with the ground.

Yet an additional object of this invention is to provide a vehicle leveling system using a device having a rotatable support assembly with a control mechanism which not only operates to sequentially actuate two hydraulic cylinders—one for rotating the assembly from a storage to an operating position and the other for engagement with the ground—but which permits limited rotation of the assembly without damage to the assembly or vehicle should the vehicle be moved inadvertently while the support assembly is in engagement with the ground.

More specifically, this invention contemplates the provision of a system for and a leveling device useful in leveling and supporting a parked vehicle. The system includes a plurality (preferably four) of the devices secured at spaced locations on the bottom of the vehicle. The devices include pivotally mounted support assemblies generally held by springs in an upper "out of the way" storage position adjacent the bottom of the vehicle. After parking, the vehicle's operator may wish to stabilize it against swaying or movement, or he may wish to bring it to a level position if parked on sloping or uneven terrain. In any such event, the leveling system is operated from a central control assembly mounted in or on the vehicle and provided with a separate control or valve for independently operating each leveling device.

The central control automatically activates an hydraulic pump upon initial manipulation of any of the individual controls. Thereafter, further manipulation of the controls will result in operation of the leveling devices, such devices preferably being activated one at a time starting with the one at the lowest corner of the vehicle and then progressing to the one at the next lowest corner. In this manner, the vehicle usually can be leveled using only two or three of the leveling devices. Should all four be used, of course, all wheels of the vehicle could be raised from the ground, and this might result in a relatively dangerous condition conducive to inadvertent and unexpected shifting of the vehicle.

Although the medium employed in the system may be compressed gas, air or other suitable substance, hydraulic fluid is preferred. Regardless of the medium employed, however, each leveling device includes a rotatably mounted support assembly having two cylinders from which two plungers are sequentially extendable. The first of the cylinders is disposed "off-center"

with respect to a pivot point around which the support assembly rotates. The hydraulic fluid is delivered to a control mechanism which initially directs the fluid into this first cylinder to extend the plunger mounted therein. As this plunger extends it engages a fixed stop means or member, and such engagement causes the cylinder to swing around the pivot point and thus to rotate the complete support assembly downwardly to a generally vertical position.

The other or second cylinder is substantially axially aligned with the above-mentioned pivot point. This cylinder does not communicate directly with the hydraulic pump or first cylinder, but rather fluid is delivered thereto only from the control mechanism and only after the support assembly has reached its lower operating position.

The control mechanism includes structure for preventing movement of fluid into the second cylinder until after the plunger of the first cylinder has been extended. This structure responds automatically to the build-up of pressure in the control mechanism after extension of the first plunger to open a passage through which fluid passes into the second cylinder to project the second plunger into engagement with the ground. It will be seen, therefore, that the plunger of the second cylinder remains retracted until completely rotated into position for extension toward the ground. Accordingly, rotation of the support assembly requires a minimum of space under the vehicle.

Should the vehicle inadvertently or accidentally be moved while the support assemblies are engaged with the ground, no damage will occur either to the assemblies or the vehicle. If the vehicle is moved in one direction the support assemblies will simply rotate beyond their vertical operating position. In this connection, the plunger of the first cylinder preferably is not connected to the stop means against which it pushes during extension. Therefore, it is free to move away from this stop to permit rotation of the assemblies beyond their extended position in contravention to the biasing action of the return springs.

If the vehicle is moved in the other direction, however, the plungers of the first cylinders will be forced upwardly against the previously mentioned stop means. Severe damage thus could occur either to the vehicle or the support assemblies if such force should not be relieved. To prevent any such damage, fluid will be returned automatically to the control mechanism by the development in the cylinders of pressure greater than that necessary for their operation. Fluid will then flow through the mechanism and into an expandable reservoir to permit inward movement of the first plunger and rotation of the support assembly. Thus, whether inadvertent vehicle movement occurs in a forward or rearward direction, the support assemblies and vehicle are protected against damage.

DESCRIPTION OF THE PREFERRED EMBODIMENT

Figure 1:
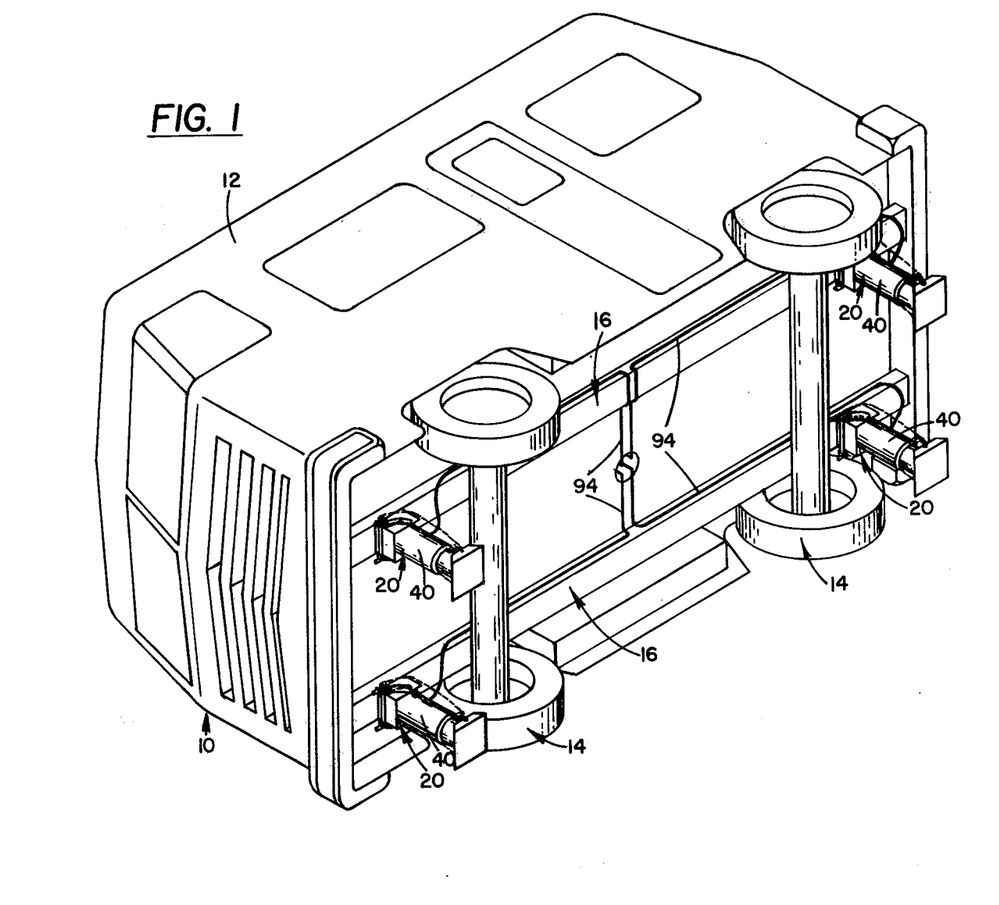
FIG. 1 is a bottom perspective view of a motorhome on which a plurality of leveling devices according to the present invention are shown in a lower operating position.

Referring now to the drawings, there is shown in FIG. 1 a motorhome 10 including an enclosed body portion 12 supported by two sets of wheel-axle assemblies 14. As will be apparent from both the preceding and following description, the present invention is not limited as to use with the type of vehicle illustrated, but may be employed with various other types of vehicles, such as campers, trailers, trucks, vans, and the like. Thus, it should be understood that the illustrated motorhome is shown for purposes of convenience only and is not to be taken as limiting the invention.

Mounted on the bottom surface or frame 16 of vehicle 10 are a plurality of leveling devices 20. Preferably four such devices are used with a vehicle of the type illustrated, one adjacent each corner. Depending upon the type of vehicle, its weight distribution, intended use, etc., however, it will be obvious that a different number of or a different mounting pattern for the devices 20 may be selected.

Calling attention particularly to FIGS. 2-5, it will be seen that the leveling device 20 includes a mounting bracket 22 which may be secured in any convenient manner as by bolts, rivets, welding, etc., to the frame or bottom portion 16 of the vehicle 10. Bracket 22 preferably is formed of a relatively substantial steel plate material, with a one piece top/back portion 24 welded or otherwise permanently and securely affixed to the spaced, parallel side plates 26. In mounting this bracket, the portion 24 should be disposed against the bottom 16 of the vehicle, with the open side 30 facing in the direction in which the support assembly 40 is to retract.

The support assembly 40 includes a first hydraulic cylinder 42 mounted on a larger hydraulic cylinder 44. The two cylinders are disposed generally parallel to one another and arranged so that their plungers extend generally in opposite directions. Also, as will be noted particularly from FIGS. 2 and 4, cylinder 42 is offset toward one side of cylinder 44 to better utilize the space provided at the upper corner of the mounting bracket 22.

Cylinders 42 an 44 preferably are assembled by means of a cylindrical sleeve 46 which is welded or otherwise affixed to cylinder 44 and provided with an internal bore 48 (see FIG. 4) of a diameter which is slightly larger than the outside diameter of cylinder 42. The outer circumference of cylinder 42 preferably is provided with a thread 50 adapted to receive a pair of positioning nuts 52 engaged with opposite ends of sleeve 46.

Mounting nuts 54 (FIG. 4) are welded or otherwise affixed to diametrically opposed sides of the cylinder 44 adjacent its closed end 56. These nuts are aligned with holes (not shown) in side plates 26 of bracket 22, and are adapted to threadedly receive a pair of pivot bolts 58 which extend through such holes. Pivot bolts 58 thus form a pivot point or means for pivoting or rotating the support assembly 40 relative to the mounting bracket 22 and vehicle 10.

Figure 2:
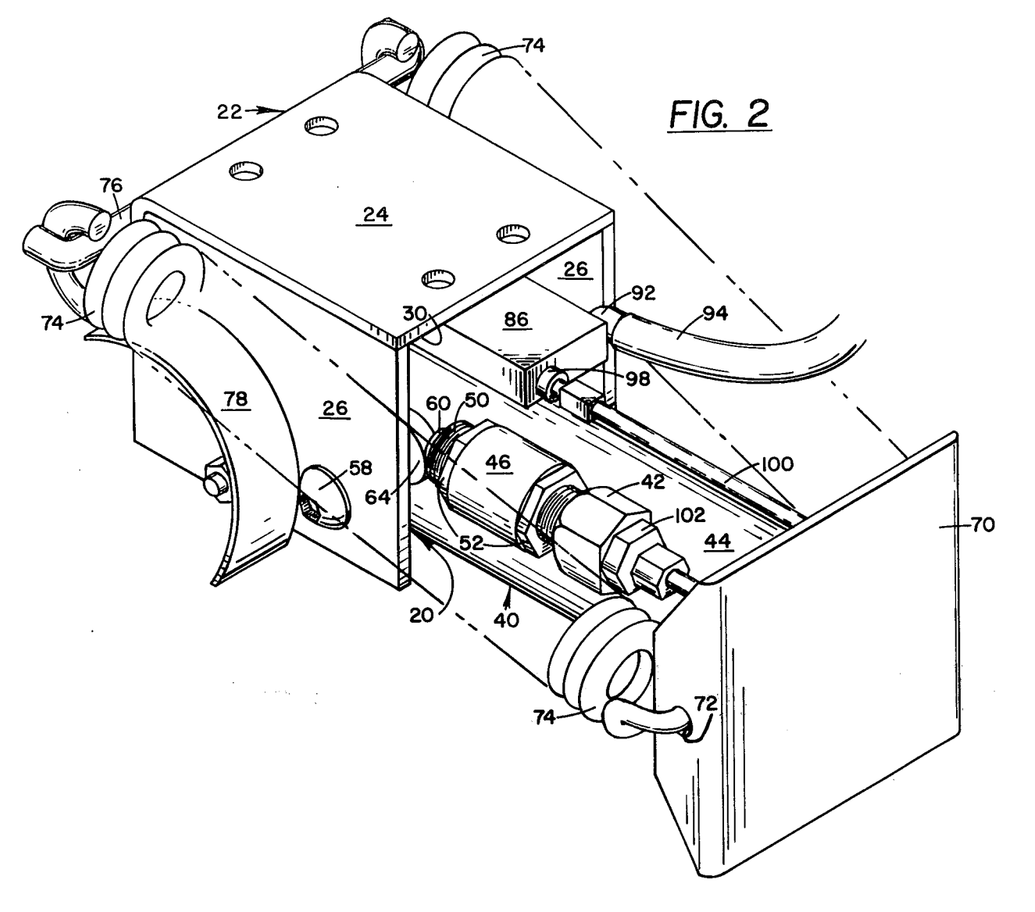
FIG. 2 is a perspective view of one of the leveling devices as illustrated in FIG. 1.

First cylinder 42 includes a first plunger 60, the outer end of which is positioned to engage stop means 62 (FIG. 4), comprising a cylindrical roller 64 rotatable on a bolt or shaft 66. The bolt 66 is threaded or otherwise secured to side plate 26, with the roller 64 spaced above and forwardly of pivots 58 in such position that its cylindrical surface will continuously engage plunger 60 throughout its travel. Thus, assuming the support assembly 40 to be in an upper storage position as shown in FIGS. 2–4, as the plunger 60 is extended from cylinder 42, its outer end will react against roller 64. Such reaction will cause support assembly 40 to rotate around pivots 58 while the outer end of the plunger 60 rotates around roller 64. As will be understood by those in the art, of course, the travel of plunger 60 relative to cylinder 42 is to be limited to the amount of extension necessary to rotate the assembly 40 into a substantially vertical operating position as illustrated in FIG. 5.

The second cylinder 44 includes a second plunger 68 substantially radially aligned with and positioned to extend outwardly from pivots 58. Attached to the outer end of plunger 68 is a foot or pad 70 which serves to provide a relatively large flat surface for contact with the ground. A pair of spring retaining apertures 72 are provided on diametrically opposed sides of foot 70 and are adapted to receive one end of tensioned coil springs 74. At their other end the springs 74 are hooked over a rod 76 which is welded or otherwise secured to the back of bracket 22. As will be noted, rod 76 is disposed above pivots 58 whereby the springs will constantly exert an upwardly directed force on the foot 70 and hence on the entire support assembly 40.

Mounted on side plates 26 are spring guides 78 which curve outwardly and downwardly relative to pivots 58. As support assembly 40 is rotated from its upper to lower position, springs 74 distend over guides 78 as best illustrated in FIG. 5 to shift their direction or angle of force forwardly of the pivots. Thus, springs 74 constantly bias the support assembly 40 toward its retracted storage position even after its rotation into a vertical operating position.

Figures 3, 4, 5:
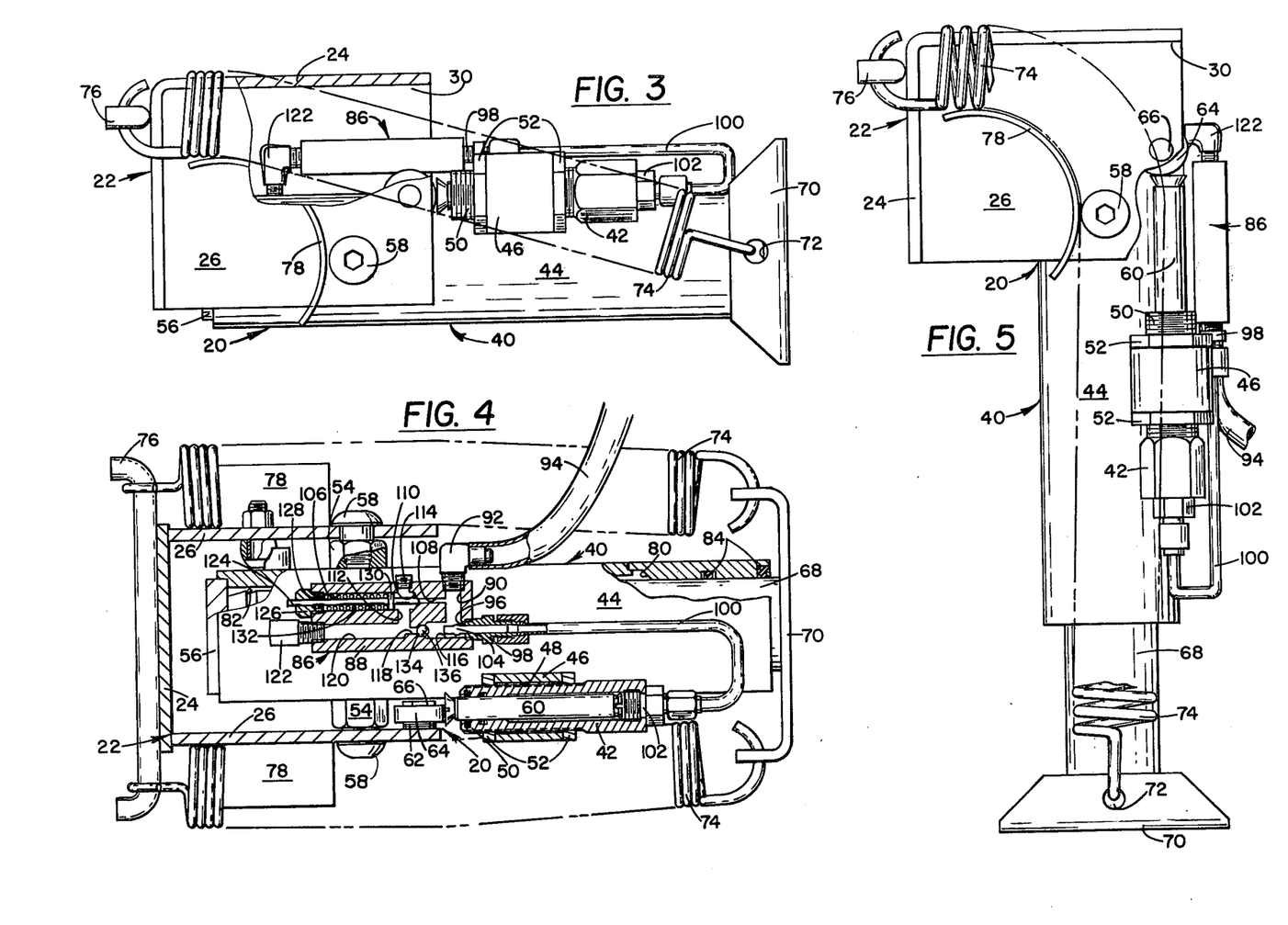
FIG. 3 is a side plan view of the leveling device shown in FIG. 2, with a portion of the mounting bracket broken away to better illustrate certain structural details.
FIG. 4 is a top plan view of the leveling device shown in FIG. 2, partially in cross section and with a portion of the mounting bracket broken away to better illustrate certain structural details.
FIG. 5 is a side plan view similar to FIG. 3 except with the plungers extended.

As best shown in FIG. 4, the second cylinder and plunger assembly 44/68 is of a single action type, of generally conventional construction and operation. The plunger 68 is extended upon introduction of a suitable hydraulic fluid, such extension being limited by abutment between the rearwardly facing reduced shoulder 80 formed in the interior wall of the cylinder 44, and the stop collar 82 carried by plunger 68. Suitable seals 84 are disposed between the interior wall of cylinder 44 and plunger 68 to prevent leakage of fluid to the atmosphere.

For reasons to be described in further detail herebelow, plunger 68 will remain in the retracted position illustrated in FIG. 4 during rotation of support assembly 40 between its upper storage position and its lower operating position. Only after assembly 40 has been rotated to its lower position will fluid enter cylinder 44 for purposes of extending plunger 68 in contravention to the biasing action of springs 74. Accordingly, the space necessary under vehicle 10 for proper rotation of the support assembly 40 is held to a minimum.

As will be clear from the preceding description, the first cylinder 42 and second cylinder 44 are operated sequentially, the plunger 68 of the second cylinder 44 remaining retracted until the plunger 60 of first cylinder 42 has been fully extended. This sequential operation is afforded by a control mechanism 86, the details of which are best illustrated in FIG. 4.

From FIG. 4 it will be noted that the control mechanism 86 is formed with a generally rectangular block or body portion 88 which is carried on cylinder 44. A series of bores, seats, threads, etc., are provided in body portion 88, these various elements being formed by standard machining operations, such as drilling, boring, reaming, threading, etc. In the following description, therefore, it is not believed necessary to specify in any great detail the manner in which the various bores, etc. are formed.

Taking these various elements in the order in which they generally are involved in the operation of the control mechanism, a transverse bore 90 is formed through one side of the body 88 adjacent its outer end. This bore 90, generally referred to hereafter as a fluid chamber, extends substantially the full width of the body 88 but not through the other side thereof. The open end or inlet of chamber 90 is threaded to receive a fitting or elbow 92 which, in turn, is adapted to receive one end of a flexible conduit or hose 94.

A first outlet 96 extends from chamber 90 through the outer end of body 88, and is threaded to receive a nipple 98. Nipple 98, as will be noted, receives one end of tube 100, the other end of which is connected to a fluid intake 102 provided on cylinder 42. Projecting inwardly of fitting or nipple 98 and transversely through chamber 90 is an extension 104 of tube 100, the purpose of which will be explained in further detail hereinafter. Extension 104, outlet 96, nipple 98 and tube 100 cooperatively form a first fluid passage extending between and communicating with chamber 90 and first cylinder 42.

Extending axially through the inner end of body 88 is a two section bore, including a relatively large diameter rearward section 106 terminating forwardly in a smaller diameter section 108 which intersects chamber 90 to form a second outlet therefrom. Connecting these two bore sections is a frusto-conical seat surface 110 through which bore 108 forms a centrally located orifice.

Rearwardly of chamber 90, another transverse bore 112 is formed through body 88, this additional bore 112 intersecting and extending beyond bore section 106. The opening formed by this bore in the side of body 88 normally is not used in the operation of the control mechanism and, therefore, is threaded for the reception of a plug 114. A screwdriver slot, hexagonal wrench socket, or the like, preferably is provided on plug 114 for use in its removal from bore 112 should draining or replacement of the fluid in body 88 be necessary.

Axially aligned with outlet 96 is a three section bore, including a relatively large forward section 116 which opens into chamber 90, a smaller intermediate section 118 which opens into bore 112, and a larger rearward section 120 which extends through the rearward end of body 88. Threaded into the open rearward end of bore 120 is an elbow 122, the second leg of which is threaded into an opening which communicates with the interior of cylinder 44. It will be seen, therefore, that bores 108, 112 and 120 cooperate with elbow 122 to provide a second fluid passage extending between and communicating with chamber 90 and cylinder 44.

Valve means comprising a rod-like valve member 124 is mounted for movement in bore 106 between an operative position in which its forward conical end surface is engaged with seat surface 110 to seal or close the orifice formed therein by bore 108, and an inoperative position spaced from surface 110 and the orifice. It will be appreciated, therefore, that the movement of fluid between chamber 90 and cylinder 44 will be controlled by vavle member 124.

The rearward end of valve member 124 is slidable through apertured plug 126 which is threaded into the outer end of bore 106. Suitable seals 128 are provided between plug 126 and valve 124 to prevent any leakage therebetween. Fixed to valve 124 is a collar or washer 130 having an outer periphery which is somewhat smaller than and freely received in bore 106 for movement therein with valve member 124.

Plug 126 and collar 130 not only serve to align valve member 124 with seat 110, but act as opposed stops adapted to receive the ends of compression spring 132. It will be understood, of course, that compression spring 132 normally biases valve member 124 outwardly into its operative position engaging seat surface 110 and closing bore 108.

Bores 116 and 118 are joined by a circular or annular shoulder 134 facing toward chamber 90 and sized to receive a valve element 136, such as a ball or sphere. Ball 136 is free to move out of engagement with shoulder 134 and into enlarged bore 116, but is restrained against entry into chamber 90 by extension 104 of tube 100. As will be obvious, shoulder 134 and ball 136 form a valve for preventing movement of fluid from chamber 90 into bore 120 whenever the pressure in chamber 90 is greater than the pressure in bore 120. On the other hand, however, bores 116 and 118 comprise a by-pass for the movement of fluid from bore 120 into chamber 90, since ball 136 will be unseated and forced into enlarged bore 116 whenever the pressure of fluid in bore 120 exceeds that of the fluid in chamber 90.

Spring 132 should be sufficiently strong to hold valve member 124 in its operative position against the pressure generated in chamber 90 and exerted against the end surface of the valve member during extension of plunger 60 from first cylinder 42. For example, if a pressure of 1500 P.S.I. is needed to extend plunger 60 and rotate support assembly 40 from its storage position to its operating position against the action of springs 74, spring 132 should exert sufficient force to hold valve member 124 closed until pressure in chamber 90 has reached, say, 1800-2000 P.S.I. This, of course, is to assure that plunger 68 of cylinder 44 remains retracted until after the support assembly has been fully rotated. Thereafter, additional pressure in chamber 90 will force valve member 124 rearwardly out of engagement with seat 110, thereby opening the orifice therethrough to permit the delivery of fluid from chamber 90 through the second passage and into the second cylinder 44 to extend plunger 68 into engagement with the ground. FIG. 5 best illustrates the support assembly 40 as disposed in its lower operating position with plunger 68 extended.

After plunger 68 has extended sufficiently to contact the ground under the vehicle 10 and raise the vehicle to the desired degree, delivery of fluid chamber 90 will, of course, be discontinued manually by the operator of the vehicle. At that point, fluid pressure throughout the two cylinders and control mechanism is equalized, thus permitting valve member 124 to move inwardly until it again seals against seat 110 and closes the second passage.

The extended position of plunger 60 is determined by the position of cylinder 42 relative to roller 64. If the position of cylinder 42 is changed as by appropriate rotation of positioning nuts 52, therefore, the extended position of plunger 60 can be correspondingly varied. This may be necessary, for example, to insure that the support assembly 40 is properly disposed in a vertical position relative to the vehicle 10 after the leveling device has been attached to the vehicle.

Assuming that the support assemblies 40 are in a vertical or lower operating position with the plungers 60 and 68 extended to support vehicle 10 as illustrated in FIGS. 1 and 5, the parts of the control mechanism 86 will be disposed as illustrated in FIG. 4. Assuming also that vehicle 10 is inadvertently moved in a forward direction without retraction of the support assemblies 40, the following sequence will occur to protect the vehicle 10 and assemblies 40 against damage.

As a result of such inadvertent movement, pressure between plunger 60 and roller 64 will increase, with a corresponding increase in pressure on the fluid in cylinder 42, the passage to cylinder 42, chamber 90, and the flexible hose 94 through which fluid is delivered from a pump, to be described hereafter. At a pre-determined pressure level of, say, 2500 P.S.I., fluid pressure will cause hose 94 to expand radially, thereby acting as a temporary reservoir for receiving fluid from chamber 90 as fluid is forced from cylinder 42 while plunger 60 moves inwardly. As a result, the support assembly 40 will rotate on pivots 52 to the extent necessary to prevent damage either to the support assembly or vehicle. Subsequently, springs 74 will retract plungers 60 and 68 and further rotate support assembly 40 to its usual storage position upon deactivation of the system by the operator of the vehicle. In this connection, of course, the one-way valve action provided by the by-pass through bores 116 and 118 will permit movement of fluid from bore 120 directly into chamber 90 for egress through hose 94 during retraction of the plunger 68.

Although not specifically illustrated, it will be understood that means other than hose 94 may be provided as a variable volume reservoir for the reception of fluid in the event of inadvertent movement of vehicle 10 as described above. For instance, a supplemental cylinder with a spring loaded plunger or a resiliently expandable container could be placed in communication with chamber 90, cylinder 42 or the passage therebetween, and serve the same purpose.

Figure 6:
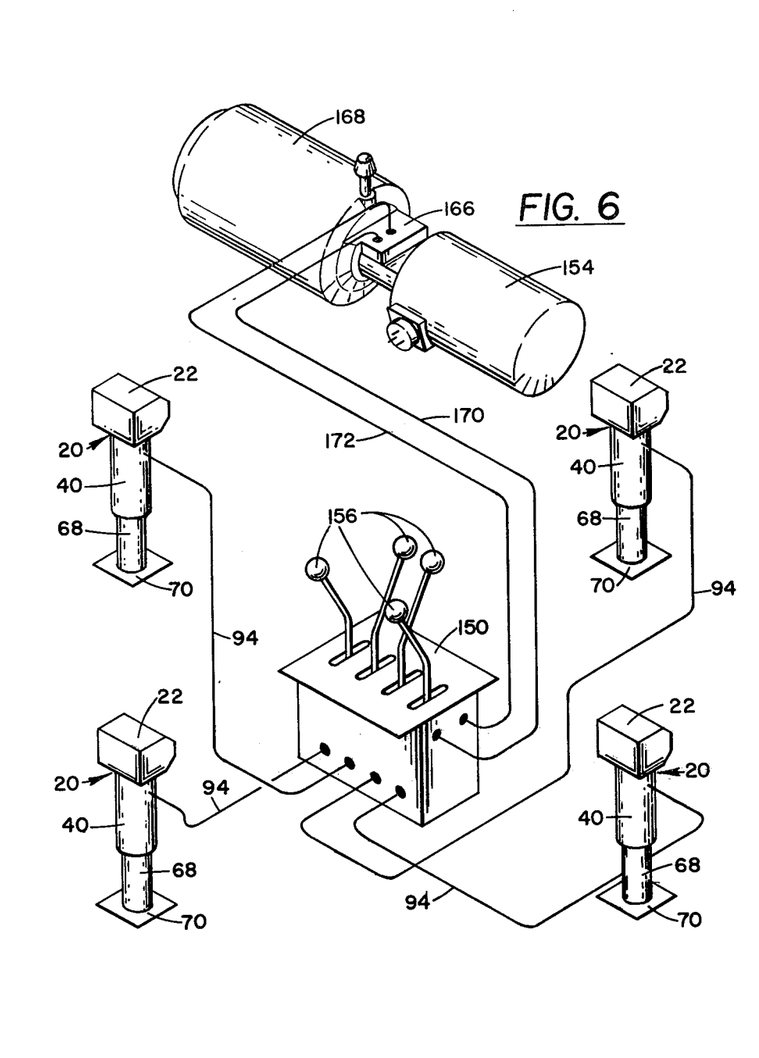
FIG. 6 is a diagrammatic view of the hydraulic components of the leveling device according to the present invention.
Figure 7:
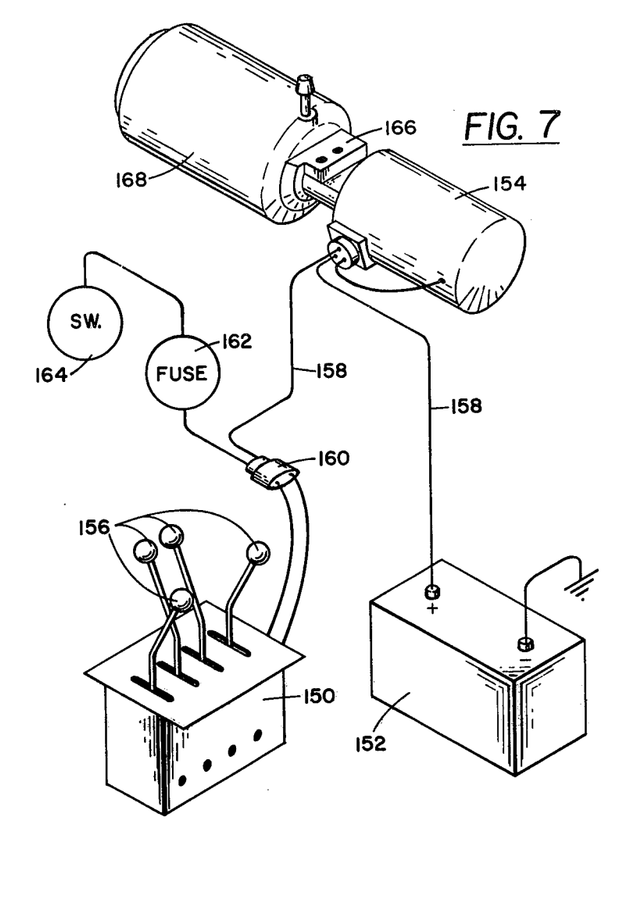
FIG. 7 is a diagrammatic view of the electrical components of the leveling system according to the present invention.

The electrical and hydraulic components utilized in the preferred embodiment of the present invention are illustrated diagramatically in FIGS. 6 and 7. It will be understood that the details of these components may be varied depending upon the type of vehicle involved and the arrangements found most convenient to the individual users. In the case of the illustrated system, however, the components hereof are arranged for use with a motorhome as illustrated in FIG. 1.

Generally speaking, it is preferred that a central control assembly 150 be mounted in the vehicle in a location convenient to the driver. Within the control assembly 150 is a switch mechanism (not shown) which will "make" an electrical circuit between the battery 152 and an hydraulic pump motor 154 to activate this motor upon initial movement of any of the individual control levers 156 from an intermediate "neutral" position. This circuit extends through suitable electrical wire 158 from battery 152 through the pump motor 154, connector 160, fuse 162 to the accessory terminal of the ignition switch 164 of the motorhome.

Operation of motor 154 will, of course, activate hydraulic pump 166 to draw fluid from reservoir 168 and deliver such fluid through conduit 170 to the central control 150. A return line 172 extends between the control 150 and pump 166 for purposes of returning fluid to the reservoir.

Included in central control 150 is a double acting fluid valve (not shown) associated with each of the individual control levers 156. Upon actuation of any one of these control valves in one direction, fluid from conduit 170 will be diverted into the flexible hose 94 associated with the actuated valve. As will be understood, hoses 94 are connected to fittings 92 of the support assemblies 40 described heretofore as comprising components of the leveling devices. Thus, upon actuating one of the control valves in the one direction, the appropriate leveling device will be operated. Opening the valve in the other direction, of course, will permit return of fluid from the support assembly 40 through control 150 and return line 172 to permit deactivation of the support assembly and its return to a storage position.

Description of Operation

The operation of the system of the present embodiment and of the leveling devices used therein will now be described.

Assuming that vehicle 10 has been parked on sloping or uneven terrain, and it is desired to level the vehicle 10 and support it against swaying while persons move about therein, the driver or operator should turn his ignition key to the accessory position. One of the control levers 156 of central control 150 should then be moved from a neutral position toward an operating position. Initially, this movement starts the pump motor 154, energy being supplied thereto through wires 158 from battery 152. Operation of motor 154 results in actuation of pump 166 for the delivery of fluid from reservoir 168 through conduit 170 to the central control 150.

Additional movement of the selected control lever 156 will open an associated valve and divert fluid from conduit 170 into hose 94 for delivery to the support assembly 40 of the particular leveling device selected for operation. Hose 94, of course, is connected to chamber 90 of control mechanism 86 which automatically diverts fluid first into cylinder 42 and then into cylinder 44.

The outer end of piston 60 reacts against and rotates around roller 64, which is fixed on the bracket 22 secured to the bottom of the vehicle 10. This reaction, in effect, pushes cylinder 42 away from the roller, causing cylinder 42 and the balance of the support assembly 40 to rotate around pivot bolts 58 in bracket 22.

Piston 60 continues to extend outwardly relative to cylinder 42 until it reaches full extension. At that point, further delivery of fluid into chamber 90 will force valve member 124 to move to its inoperative position, thereby opening the fluid passage into cylinder 44 for extension of plunger 68 mounted therein.

During extension of plunger 60, the support assembly 40 is rotated from a relatively horizontal upper or storage position under vehicle 20 to a vertical operating position. The assembly remains in this position during extension of plunger 68. The extension of plunger 68, of course, is controlled by the operator through closure of the control valve of the central control 150 after plunger 68 has been extended sufficiently to level and/or support the vehicle. The individual leveling devices preferably are operated one at a time, starting with the one at the lowest corner of the vehicle.

After all four leveling devices have been extended as desired, the four individual control levers are returned to their neutral position, thus stopping motor 154 and discontinuing the delivery of fluid to the central control 150. The valve in this control, however, are maintained closed, thereby retaining fluid in the leveling devices to hold them in their operating positions.

When it is desired to move the vehicle 10, it is merely necessary for the operator to move the control levers to a valve open position, which thus permits the return of fluid from the leveling devices through return line 172 in response to the retraction of plungers 68 and 60 as the support assembly 40 is pulled to its upper storage position by return springs 74.

Should the operator forget to retract the support assemblies 40 before moving the vehicle, however, neither the vehicle or support assemblies will be damaged by the pressure of plunger 60 against roller 64. This feature is provided by the provision of a variable volume reservoir which will accept fluid from chamber 90 should pressure in cylinders 42 approach a pre-determined excessive level. In this connection, hoses 94 preferably are of about equal length—ranging from 5' to 8' each. Such a length has been found adequate to permit displacement of plunger 60 a sufficient amount to avoid damage in the event of movement of the vehicle with the plungers extended. Subsequently, of course, the operator of the vehicle will realize his error, and will then retract the plungers and return the support assembly to its fully retracted position simply by opening the valves associated with the control levers.

Although one embodiment of this invention has been described and illustrated with some particularly, it will be understood that such description and illustrations are for illustration only, and are not to be taken as limiting the scope of the present invention as defined in the following claims.

I claim:

1. In a device for use in a system of leveling a trailer, camper, motorhome, truck, or other vehicle relative to the terrain on which it is standing; a support assembly rotatably mounted on the lower surface of said vehicle and provided with operating means including a first hydraulic cylinder from which a first plunger is extendable to rotate said support assembly from an upper storage position to a lower operating position, and a second hydraulic cylinder from which a second plunger is extendable to engage said terrain; manually actuated pump means for delivering fluid to said operating means; and control means for directing said fluid sequentially into said first cylinder and then said second cylinder, characterized by said control means being operatively disposed between said pump means and said operating means and comprising (A) means defining a fluid chamber communicating with said pump means,
(B) means defining a first passage communicating with said chamber and said first cylinder,
(C) means defining a second passage communicating with said chamber and said second cylinder,
(D) means for sealing said second passage against the movement of fluid therethrough during extension of said first plunger responsive to the delivery of fluid from said pump means through said chamber and said first passage into said first cylinder, and (E) means for displacing said sealing means to open said second passage for the movement of fluid therethrough into said second cylinder to extend said second plunger responsive to the further delivery of fluid from said pump means into said chamber subsequent to the extension of said first plunger.

2. In a device according to claim 1, characterized by said sealing means comprising
   (A) an annular seat section having a centrally disposed orifice through which said second passage extends, and
   (B) a valve member movable between an operative position engaging said seat section and closing said orifice, and an inoperative position spaced from said seat section and said orifice.

3. In a device according to claim 2, characterized by said displacing means comprising
   (A) an end surface provided on said valve member and sized to enter said orifice when said valve member is in said operative position, and
   (B) resilient means biasing said valve member toward said operative position, said resilient means generating a biasing force
      (i) sufficient to move said valve member to and hold said valve member in said operative position in contravention to the pressure generated in said chamber and exerted against said end surface during extension of said first plunger, but
      (ii) insufficient to prevent movement of said valve member to said inoperative position in response to the pressure generated in said chamber and exerted against said end surface during said further fluid delivery.

4. In a device according to claim 3, characterized by means for receiving fluid from said control means to permit movement of fluid from said first cylinder and concomitant retraction of said first plunger in response to the development of fluid pressure within said control means which is greater than that necessary to extend said second plunger.

5. In a device according to claim 4, characterized by said fluid receiving means comprising an expandable member communicating with said fluid chamber.

6. In a device according to claim 5, characterized by said expandable member comprising a radially resilient flexible hose communicating with said pump means and serving as a conduit for the movement of fluid between said pump means and said fluid chamber.

7. In a device according to claim 3, characterized by said control means being carried by said support assembly and comprising a body portion containing said fluid chamber and having
   (A) an inlet communicating with said chamber and said pump means,
   (B) a first outlet communicating with said chamber and said first passage,
   (C) a second outlet communicating with said chamber and said second passage, and
   (D) a bore intersecting said second passage and terminating in a frusto-conical surface defining said annular seat section and said centrally disposed orifice.

8. In a device according to claim 7, characterized by said valve member and said resilient means being disposed in said bore in axial alignment with said conical surface, said valve member being reciprocal in said bore between said operative and said inoperative positions.

9. In a device according to claim 8, characterized by
   (A) a by-pass communicating with said fluid chamber and said second passage outwardly of said sealing means, and
   (B) valve means movable in said by-pass between an operative position blocking said by-pass in response to delivery of fluid into said chamber, and an inoperative position opening said by-pass in response to the development of pressure in said second cylinder which is greater than that in said chamber.

10. In a device according to claim 9, characterized by
    (A) said by-pass being defined by
       (i) a larger bore opening into said chamber,
       (ii) a smaller bore opening into said second passage, and
       (iii) an annular shoulder joining said bores and defining a circular seat facing toward said chamber, and
    (B) said valve means having a sealing surface engageable with said circular seat to effect said blocking of said by-pass responsive to said delivery of fluid into said chamber from said pump means.

11. A system for leveling a trailer, camper, motorhome, truck or other vehicle relative to the terrain on which it is standing, characterized by a plurality of leveling devices according to claim 1 being mounted on the lower surface of said vehicle.

12. A system according to claim 11, characterized by a radially resilient hose communicating with said pump means and the control means of each said device, each said hose defining both
    (A) a conduit for the movement of fluid between said pump means and said control means and
    (B) a variable volume reservoir for the reception of fluid from said control means to permit movement of fluid from said first cylinder and concomitant retraction of said first plunger in response to the development of fluid pressure within said control means which is greater than that necessary to extend said second plunger.

13. A system according to claim 11, characterized by said second hydraulic cylinder being axially shiftable relative to said support assembly to selectively vary the rotative movement of said support assembly relative to said lower surface.

* * * * *